2,802,001
2,5-BIS-ETHYLENEIMINO-3,6-BIS-ACYLAMINO-PARA-BENZOQUINONES

Adrian Marxer, Basel, Switzerland, assignor to Ciba Pharmaceutical Products, Inc., Summit, N. J.

No Drawing. Application November 19, 1956, Serial No. 622,752

Claims priority, application Switzerland November 25, 1955

8 Claims. (Cl. 260—239)

This invention relates to 2,5-bis-ethyleneimino-benzoquinones. More particularly the invention concerns 2,5-bis-ethyleneimino-3,6-bis-acylamino-para - benzoquinones of the formula

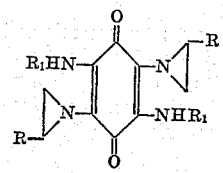

wherein R represents hydrogen or methyl and $R_1$ stands for a lower alkanoyl radical containing 2–6 carbon atoms, such as acetyl, propionyl or butyryl.

The new benzoquinone compounds are active against amoebae, for example, *Entamoeba histolytical,* and can be used as medicaments for the treatment of diseases caused by amoebae. They are also active against bacteria and can, accordingly, be used as antibacterial agents and disinfectants. Especially valuable with respect to its activity against amoebae is the 2,5-bis-ethyleneimino-3,6-bis-acetamino-para-benzoquinone of the formula

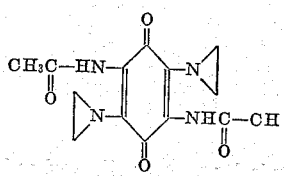

The invention also provides a process for the manufacture of the above new compounds, wherein a 2,5-dichloro - 3,6 - bis - lower alkanoylamino - para - benzoquinone is reacted with ethyleneimine or C-methyl-ethyleneimine.

It is of advantage to carry out the reaction in an inert solvent, such as dioxane or benzene, or, also in the presence of an alcohol, such as ethyl alcohol, isopropyl alcohol or butyl alcohol, or isopropyl ether. There may be used a condensing agent such as a tertiary base. The reaction may be carried out at room or a raised temperature. In a preferred emboidment of the invention 2,5-dichloro-3,6-bis-acetamino-para-benzoquinone is treated with ethylene imine in dioxane as diluent and triethylamine as condensing agent and the 2,5-bis-ethyleneimino-3,6-bis-acetamino-para-benzoquinone isolated.

The starting materials are known or can be made by customary methods.

The new quinones of this invention can be used as medicaments in the form of pharmaceutical preparations containing them in admixture with an organic or inorganic carrier suitable for enteral, parenteral or local administration. As carriers there come into consideration substances which do not react with the new compounds, for example, gelatine, lactose, starches, magnesium stearate, talc, vegetable oils, benzyl alcohols, gums, polyalkylene glycols, white petroleum jelly, cholesterol or other known carriers for medicaments. The pharmaceutical preparations may be made up in the form, for example, of tablets, dragees, powder, salves, creams, suppositories or in liquid form as solutions, suspensions or emulsions. If desired, they may be sterilized and/or may contain auxiliary substances, such as preserving, stabilizing, wetting or emulsifying agents. They may also contain other therapeutically useful substances.

The following examples illustrate the invention:

Example 1

43.65 grams of 2,5-dichloro-3,6-bis-acetamino-para-benzoquinone are suspended in 500 cc. of dioxane, and a mixture of 33.5 grams of triethylamine and 25.5 cc. of ethyleneimine in 100 cc. of dioxane is added dropwise, while stirring. The internal temperature gradually rises to 35° C. The reaction is complete after heating the mixture for 9 hours on a water bath at 50° C. The precipitate is separated, washed with ethanol, and the crystals of triethylamine hydrochloride therein are dissolved out by agitation with 200 cc. of water. The mixture is again filtered with suction, the filter residue is washed with water and ethanol, and the 2,5-bis-ethyleneimino-3,6-bis-acetamino-para-benzoquinone so obtained is dried. It forms red crystals decomposing at 203° C. and has the formula

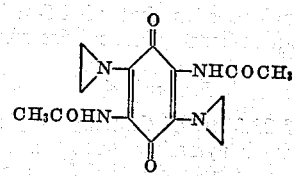

Example 2

31.92 grams of 2,5-dichloro-3,6-bis-propionylamino-para-benzoquinone are suspended in 340 cc. of dioxane. With good stirring at room temperature, a mixture of 16.9 cc. of ethyleneimine and 22.25 grams of triethylamine in 65 cc. of dioxane is added dropwise in the course of 15–20 minutes. The temperature gradually rises to 40° C. and when the slightly exothermic reaction has subsided, the mixture is maintained at 45° C. for another 7 hours. After that time, the yellow crystals of bis-propionylamino-dichloroquinone have disappeared and in their stead a red crystal magma has formed. These crystals are separated by filtration, washed with dioxane, and suspended in 150 cc. of water in order to remove the triethylamine hydrochloride which has formed. The suspended crystals are again isolated by filtering with suction and washed with ethanol. The resulting 2,5-bis-ethyleneimino - 3,6 - bis - propionylamino-para-benzoquinone of the formula

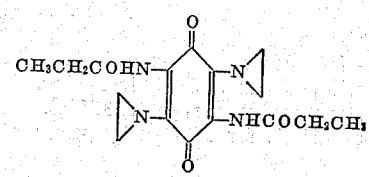

melts at 213° C. with rapid decomposition.

The 2,5-dichloro-3,6-bis-propionylamino-para - benzoquinone used as starting material can be prepared as follows:

62.1 grams of 2,5-dichloro-3,6-diamino-para-benzoquinone are suspended in 260 cc. of propionic acid anhydride and 1.75 cc. of concentrated sulfuric acid added dropwise. The temperature rises about 5–10° C. The mixture is then stirred for 5 hours on a water bath of 45° C., and allowed to stand overnight. 200 cc. of ethanol are added slowly with ice cooling and the resulting yellow crystallisate is filtered with suction, washed thoroughly with ethanol, and recrystallized from glacial acetic acid. There are obtained yellow needles of 2,5-dichloro - 3,6 - bis - propionylamino-para-benzoquinone of melting point 253° C. (decomposition).

*Example 3*

31.25 grams of 2,5-dichloro-3,6-bis-butyrylamino-para-benzoquinone are suspended in 300 cc. of dioxane. At room temperature a mixture of 15.3 cc. of ethyleneimine and 20.33 grams of triethylamine in 60 cc. of dioxane is added dropwise with stirring. The temperature rises spontaneously to 35° C. Stirring is then continued for 7 hours with heating to 45° C. Working up is carried out as described in Example 1. There are thus obtained red crystals of 2,5-bis-ethyleneimino-3,6-bis-butyrylamino-para-benzoquinone of the formula

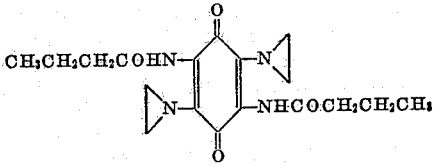

of melting point 214° C. (decomposition).

The preparation of the starting material, 2,5-dichloro-3,6-bis-butyrylamino-para-benzoquinone forming ochre-colored crystals of melting point 251-252° C. from 2,5-dichloro-3,6-diamino-para-benzoquinone and butyric acid anhydride is analogous to that of 2,5-dichloro-3,6-bis-propionylamino-para-benzoquinone described in Example 2.

*Example 4*

A mixture of 23.3 cc. of C-methyl-ethyleneimine and 25.30 grams of triethylamine in 65 cc. of dioxane is added dropwise to a suspension of 29.11 grams of 2,5-dichloro-3,6-bis-acetamino-para-benzoquinone in 340 cc. of dioxane. The exothermic reaction brings the temperature from 25° C. to 50° C. Stirring is continued for 9 hours while the reaction mixture is in a water bath of 45° C. Working up is carried out in a manner analogous to that of Example 1. There are obtained pale red crystals of 2,5-bis-(methyl-ethyleneimino)-3,6-bis-acetamino-para-benzoquinone of the formula

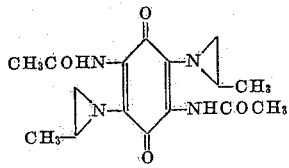

of melting point 199-202° C. (decomposition).

*Example 5*

A mixture of 11.65 cc. of C-methyl-ethyleneimine and 12.65 grams of triethylamine in 35 cc. of dioxane is added dropwise to a suspension of 15.96 grams of 2,5-dichloro-3,6-bis-propionylamino-para-benzoquinone (obtainable according to Example 2) in 200 cc. of dioxane. The temperature gradually rises to 35° C. and is then maintained at 45° C. for 9 hours by means of a water bath. Working up is carried out as described in Example 1 and there are obtained pale red crystals of 2,5-bis-(methyl-ethyleneimino)- 3,6-bis-propionylamino-para-benzoquinone of the formula

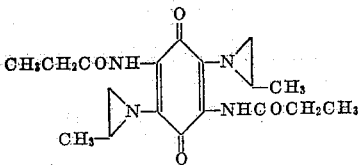

of melting point 209° C.

What is claimed is:

1. 2,5 - bis - ethyleneimino-3,6-bis-acylamino-para-benzoquinones of the formula

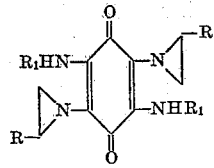

wherein R represents a member selected from the group consisting of hydrogen and methyl, and $R_1$ stands for a lower alkanoyl radical containing 2–6 carbon atoms.

2. 2,5 - bis - ethyleneimino-3,6-bis-acylamino-para-benzoquinones of the formula

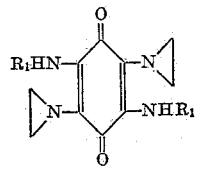

wherein $R_1$ stands for a lower alkanoyl radical containing 2–6 carbon atoms.

3. 2,5-bis-(methyl-ethyleneimino)-3,6- bis - acylamino-para-benzoquinones of the formula

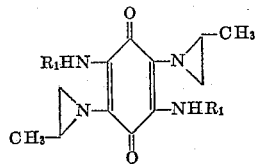

wherein $R_1$ stands for a lower alkanoyl radical containing 2–6 carbon atoms.

4. 2,5-bis-ethyleneimino-3,6-bis-acetamino-para-benzoquinone.

5. 2,5-bis-ethyleneimino-3,6-bis-propionylamino - para-benzoquinone.

6. 2,5-bis-ethyleneimino-3,6 - bis - butyrylamino - para-benzoquinone.

7. 2,5-bis-(methyl-ethyleneimino)-3,6 - bis - acetamino-para-benzoquinone.

8. 2,5-bis-(methyl-ethyleneimino)-3,6 - bis - propionyl-amino-para-benzoquinone.

No references cited.